US009753843B2

(12) United States Patent
Kandpal

(10) Patent No.: US 9,753,843 B2
(45) Date of Patent: Sep. 5, 2017

(54) AUTOMATED TESTING OF WEB-BASED APPLICATIONS

(71) Applicant: Accenture Global Services Limited, Dublin (IE)

(72) Inventor: Priyank Kandpal, Maharashtra (IN)

(73) Assignee: Accenture Global Services Limited, Dublin (IE)

( * ) Notice: Subject to any disclaimer, the term of this patent is extended or adjusted under 35 U.S.C. 154(b) by 189 days.

(21) Appl. No.: 14/549,179

(22) Filed: Nov. 20, 2014

(65) Prior Publication Data

US 2016/0147645 A1 May 26, 2016

(51) Int. Cl.
G06F 9/44 (2006.01)
G06F 11/36 (2006.01)

(52) U.S. Cl.
CPC ...... *G06F 11/3688* (2013.01); *G06F 11/3672* (2013.01); *G06F 11/3684* (2013.01)

(58) Field of Classification Search
CPC ............. G06F 17/3089; G06F 17/2247; G06F 11/3676; G06F 11/3692; G06F 17/30876; G06F 2221/2119; G06F 17/30861; G06F 9/45529

See application file for complete search history.

(56) References Cited

U.S. PATENT DOCUMENTS 6,002,871 A * 12/1999 Duggan .............. G06F 11/3664
714/38.12

7,469,302 B2 * 12/2008 Whittle ................... G06F 9/542
709/248

(Continued)

FOREIGN PATENT DOCUMENTS

WO WO 2012/019639 2/2012

OTHER PUBLICATIONS

Yao-Wen Huang et al.; Web Application Security Assessment by Fault Injection and Behavior Monitoring; 2003 ACM; pp. 148-159; <http://dl.acm.org/citation.cfm?id=775174>.*

(Continued)

*Primary Examiner* — Thuy Dao
*Assistant Examiner* — Cuong V Luu
(74) *Attorney, Agent, or Firm* — Fish & Richardson P.C.

(57) ABSTRACT

Methods, systems, and apparatus, including computer programs encoded on a computer storage medium, are described that enable automated testing of web applications. Techniques include receiving a web application and a test script including user-specified instructions for testing the web application. The user-specified instructions are converted into commands that include first-type commands executable by a browser automation module to control operations of a web browser, and second-type commands that are not executable by the browser automation module, where the total number of commands exceeds a number of instructions in the test script. The first-type commands are provided for execution to the browser automation module to control operations of the web browser, and the second-type commands are executed to control operations of the at least one computer that cannot be controlled by the browser automation module. A report is output based on executing the first-type and second-type commands.

20 Claims, 6 Drawing Sheets

(56) References Cited

U.S. PATENT DOCUMENTS

| | | | | |
|---|---|---|---|---|
| 7,934,201 | B2* | 4/2011 | Sweis | G06F 8/74 717/124 |
| 8,726,173 | B2* | 5/2014 | Edwards | G06F 17/30899 715/760 |
| 8,745,641 | B1* | 6/2014 | Coker | G06F 11/3668 719/313 |
| 8,875,102 | B1 | 10/2014 | Feng | |
| 2003/0005044 | A1 | 1/2003 | Miller et al. | |
| 2005/0066018 | A1* | 3/2005 | Whittle | G06F 9/542 709/223 |
| 2006/0101336 | A1* | 5/2006 | Edwards | G06F 17/30899 715/700 |
| 2008/0092119 | A1* | 4/2008 | Sweis | G06F 8/74 717/124 |
| 2009/0037881 | A1 | 2/2009 | Christy et al. | |
| 2010/0037210 | A1* | 2/2010 | Okada | G06F 11/3684 717/125 |
| 2013/0219368 | A1* | 8/2013 | Carteri | G06F 11/3688 717/126 |
| 2014/0215439 | A1* | 7/2014 | Krishnan | G06F 11/3664 717/124 |
| 2014/0229920 | A1* | 8/2014 | Rossi | G06F 11/3664 717/125 |
| 2014/0380278 | A1* | 12/2014 | Dayan | G06F 11/3692 717/124 |
| 2015/0169434 | A1* | 6/2015 | De Angelis | G06F 11/3688 717/126 |
| 2015/0186249 | A1* | 7/2015 | Miller | G06F 11/3688 717/127 |

OTHER PUBLICATIONS

Sebastian Elbaum et al.; Leveraging User-Session Data to Support Web Application Testing; 2005 IEEE; pp. 187-202; <http://ieeexplore.ieee.org/stamp/stamp.jsp?arnumber=1423991>.*

Sastian Elbaum et al.; proving Web Application Testing with User Session Data; 2003 IEEE; pp. 49-59; <http://dl.acm.org/citation.cfm?id=776823>.*

David C. Kung et al.; An Object-Oriented Web Test Model for Testing Web Applications; 2000 IEEE; pp. 111-120; <http://ieeexplore.ieee.org/stamp/stamp.jsp?arnumber=883784>.*

Jim Conallen; Modeling web application architectures with UML; 1999 communication of the ACM; pp. 63-70; <http://dl.acm.org/citation.cfm?id=317677>.*

Hassan Reza et al.; A Model Based Testing Technique to Test Web Applications Using Statecharts; 2008 IEEE; pp. 183-188; <http://ieeexplore.ieee.org/stamp/stamp.jsp?arnumber=4492476>.*

Selenium Documentation [online], [retrieved on Nov. 20, 2014]. Retrieved from the Internet: http://www.seleniumhq.org/docs/index.jsp, 4 pages.

Introduction—Selenium Documentation [online], [retrieved on Nov. 20, 2014]. Retrieved from the Internet: http://www.seleniumhq.org/docs/01_introducing_selenium.jsp, 8 pages.

European Extended Search Report in Application No. 15190521.3, mailed May 4, 2016, 8 pages.

* cited by examiner

AUTOMATED TESTING OF WEB-BASED APPLICATIONS

TECHNICAL FIELD

This specification generally describes systems and processes for automated testing of web applications.

BACKGROUND

Web-based applications (web applications) are software applications that are executed in an Internet web browser. A web application typically includes software code that is stored and maintained in a remote server. When a user accesses the web application from a web browser, software code for the web application is transmitted from the server to the user's computer and is executed on the user's web browser. The web application is often downloaded by the user as part of a larger web document (e.g., as software code embedded within a web page) and typically provides dynamic content within the web page that can change without the web page itself being reloaded. Different web applications are implemented using various techniques in various programming languages. In some scenarios, a web application utilizes a combination of server-side software code (e.g., Active Server Pages (ASP), PHP, etc.) that is executed on a remote server, and client-side software code (e.g., HyperText Markup Language (HTML), JavaScript, Cascading Style Sheets (CSS), Flash plug-ins, Java applets, etc.) that is executed by the user's web browser. In such scenarios, the client-side software typically enables front-end presentation of information and interaction with the user via the user's web browser, while the server-side software typically enables back-end storage and retrieval of information. Web applications are used in a variety of different types of web pages to enable a user to dynamically interact with a web page, in addition to viewing static content on the web page.

SUMMARY

In one aspect, a computer-implemented method is performed by at least one computer, and the method includes receiving a web application to be tested and receiving a test script that includes a plurality of user-specified instructions for testing the web application. The method also includes converting the plurality of user-specified instructions from the test script into a plurality of commands that includes first-type commands executable by a browser automation module to control operations of a web browser, and second-type commands that are not executable by the browser automation module. A number of commands in the plurality of commands exceeds a number of instructions in the test script. The method also includes executing the plurality of commands while the web application is executing on the web browser. Executing the plurality of commands includes providing the first-type commands to the browser automation module to control operations of the web browser and executing the second-type commands to control operations of the at least one computer that cannot be controlled by the browser automation module. The method further includes outputting a report based at least on executing the first-type commands and the second-type commands.

Implementations may include one or more of the following features. In some implementations, converting the plurality of user-specified instructions from the test script into a plurality of commands includes expanding a single user-specified instruction from the test script into at least one first-type command and at least one second-type command.

In some implementations, executing the plurality of commands includes executing a sequence of commands that includes an intermixing of a plurality of first-type commands with a plurality of second-type commands.

In some implementations, the method also includes determining one or more user-specified parameters, providing the one or more user-specified parameters with the first-type commands to the browser automation module, and executing, by the browser automation module, the first-type commands to control operations of the web browser based on the one or more user-specified parameters.

In some implementations, executing, by the browser automation module, the first-type commands to control operations of the web browser includes at least one of opening a new web browser window, navigating to a different web page, or operating an interactive component in a web page.

In some implementations, executing, by the browser automation module, the first-type commands to control operations of the web browser includes converting the first-type commands into commands that are native to the web browser and that perform the operations of the web browser.

In some implementations, the first-type commands are in a first programming language that is different than a programming language of the commands that are native to the web browser.

In some implementations, the commands that are native to the web browser include a direct call to the web browser using a software driver for the web browser.

In some implementations, executing the second-type commands includes executing the second-type commands without utilizing the browser automation module, and the operations that are controlled by executing the second-type commands include at least one of selecting a software driver for a web browser, retrieving data contained in an element of a web page, or taking a screen shot of a web page.

In some implementations, the method further includes determining a result of executing, by the browser automation module, at least one first-type command, wherein executing the second-type commands includes executing at least one second-type command based on the result of executing the at least one first-type command by the browser automation module.

In some implementations, executing the at least one second-type command based on the result of executing the at least one first command by the browser automation module includes comparing the result of executing the at least one first-type command with a user-specified condition; and executing the at least one second-type command based on comparing the result with the user-specified condition.

In some implementations, the result of executing the at least one first-type command by the browser automation module includes text that is included in content of a web page or in a URL of a web page, and wherein comparing the result with a user-specified condition includes comparing the text with a user-specified text string.

In some implementations, the result of executing the at least one first-type command by the browser automation module includes a measured time delay of loading content of a web page in the web browser, and wherein comparing the output with a user-specified condition includes comparing the measured time delay with a user-specified threshold.

In some implementations, executing the at least one second-type command based on comparing the result of executing the at least one first-type command by the browser automation module with the user-specified condition includes, based on determining that the measured time delay of loading the content of the web page is greater than the user-specified threshold, determining whether a portion of the content of the web page has loaded.

In some implementations, the method further includes operating a communication component of the at least one computer to access the user-specified condition from a memory component located in a database external to the at least one computer.

In some implementations, the first-type commands executable by the browser automation module and the second-type commands that are not executable by the browser automation module are both written in the same programming language.

In some implementations, the method further includes determining, based on the result of performing the automated test of the web application, whether the web application satisfies at least one user-specified performance criteria.

In some implementations, outputting a report based on a result of performing the automated test of the web application includes determining a report format based at least on at least one second-type command; and generating a HTML document according to the determined report format.

All or part of the features described throughout this application can be implemented as a computer storage medium encoded with a computer program, the computer program comprising instructions that are executable by one or more processors. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

Figure 1:
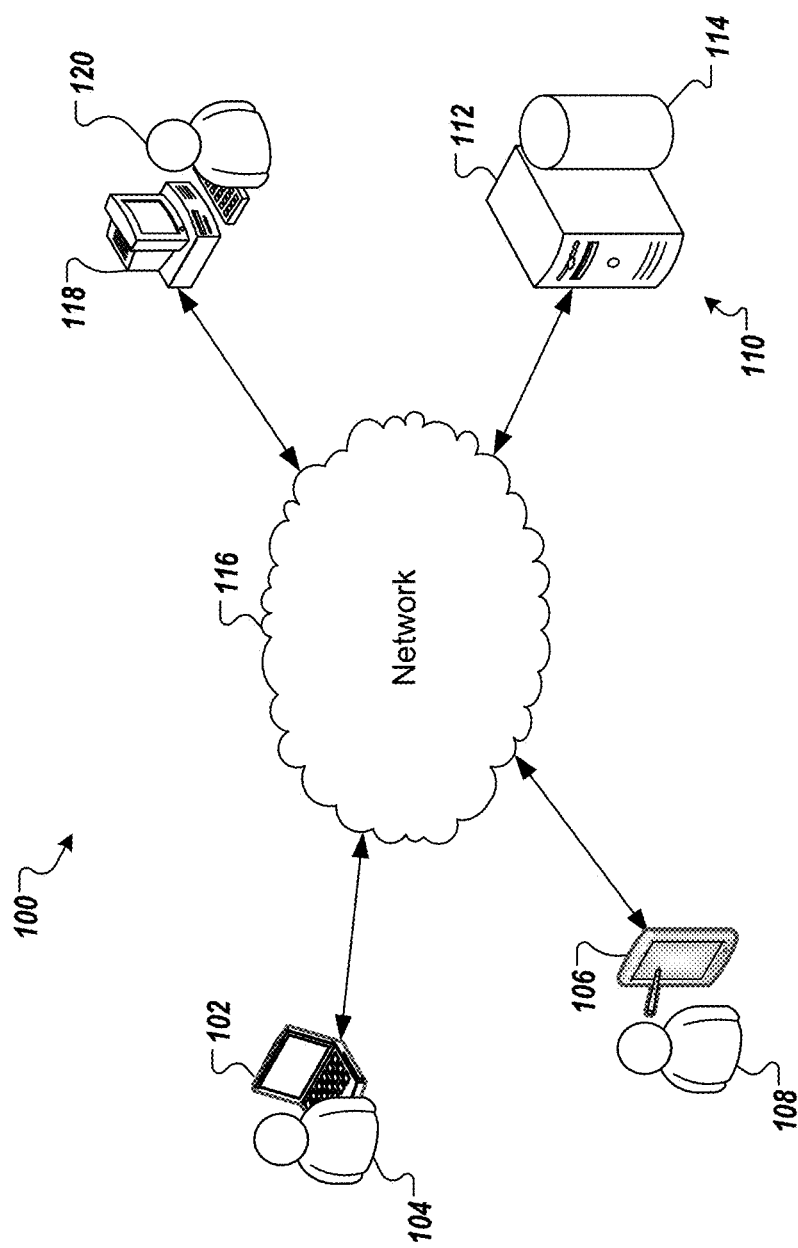
FIG. 1 is a block diagram illustrating an example of a system that can execute implementations of the present disclosure.

In the following text, a detailed description of examples will be given with reference to the drawings. It should be understood that various modifications to the examples may be made. In particular, elements of one example may be combined and used in other examples to form new examples. Like reference symbols in the various drawings indicate like elements.

DETAILED DESCRIPTION

A web application is typically designed to operate under many different types of usage scenarios, including different types of web pages in which the web application is rendered, different types of web browsers, different user navigation behavior, and different types of computing devices. A web application that fails to operate properly under a particular usage scenario can affect not only the web application itself, but also the content in the surrounding web page that hosts the web application. The process of testing a web application is typically a complex process involving testing numerous different scenarios and simulating numerous different user behaviors.

A system according to the present disclosure enables automated testing of web applications that run on web browsers. In some implementations, the system enables a user to perform more comprehensive testing of web applications using a simpler set of instructions than would otherwise be possible. The system may enable the user to use simple instructions to execute complex testing operations. In some implementations, the system may also facilitate using parameterization to customize the testing operations. The system may provide logical test functionality that enables a user to perform a variety of tests on the performance of a web application. Based on the results of the testing, the system may provide customizable reports. For example, the system may provide screenshots or other types of data in the reports.

In some implementations, the system includes a web application testing module that controls a web browser and other components of a computing system to test the operation of a web application. The web application testing module may, in some implementations, convert user-input instructions into more complex low-level commands that control a web browser as well as other components of the testing system that are utilized to execute the web application. As such, the web application testing module may provide a unified, comprehensive, and easy-to-use framework for testing web applications.

In some implementations, the web application testing module may utilize a browser automation module. The browser automation module may automate a user's actions in a web page. For example, a browser automation module may enable a user to specify a set of commands and, based on the commands, may control a series of operations on the web browser, such as loading a particular web page, filling out a form (e.g., a textbox) on the web page, clicking on a button, etc.

However, a browser automation module may be limited. For example, in some cases, a browser automation module may be unable to perform more advanced operations that are specified by a test scenario. Such operations may include, for example, advanced functionality, such as comparing text within a webpage with a user-specified text string, measuring a time delay for the loading of a web page, taking screenshots of a web page, connecting with a remote database to store/retrieve information, etc. In such cases, a user implementing the test scenario may be required to directly control the components of the testing system to perform such operations, which may require knowledge of a particular programming language required to interface with those components.

Such difficulties may be overcome by a web application testing module that provides a more comprehensive testing environment to control not only those operations of the web browser that can be operated by a browser automation module, but also other operations of a testing system involved in testing a web application. The web application testing module may provide this additional functionality, along with the functionality of a web browser automation module, under a single unified framework that allows a user to perform more comprehensive testing of web applications than would otherwise be possible using a browser automation module alone.

For example, the web application testing module may receive, as input, a test script containing user-specified instructions. The web application testing module may convert the test script into a series of commands to control operations of various components of the testing system. The conversion of the user-specified test script into the series of commands may occur entirely before execution of the commands, or may occur at least partially during execution of some of the commands. In some implementations, the series of commands may include two different types of commands that may be intermixed in a particular order. The system may execute the series of commands in the specified order by providing the first type of commands to the browser automation module to control a web browser and executing the second type of commands to control operations of components (e.g., non-browser components) that are not controlled by the browser automation module.

In addition, in some implementations, the web application testing module may enable a user to specify simple, high-level instructions, and may convert those user instructions into more complex, low-level commands that control the different operations of a computer involved in testing the web application. The testing module may also enable conditional branches in the testing, such that some low-level commands are dynamically generated by the testing module based on results of executing previous low-level commands. In some implementations, the web application testing module may also facilitate parameterization, enabling a user to customize the testing to include different test scenarios.

As such, the web application testing system may facilitate faster and more efficient testing of web applications, in addition to providing a more comprehensive testing environment.

FIG. 1 depicts an example system 100 in which implementations of the present disclosure may be implemented. In the example system 100 of FIG. 1, client device 102, operated by user 104, may execute a web application. In addition, there may be other devices, such as device 106 operated by user 108, that also execute the same web application.

The web application may be hosted by a remote system, such as host system 110 in FIG. 1. In some implementations, the host system 110 may provide client-side information that is downloaded and executed on web browsers rendered by the client devices 102 and 106. The web application hosting system (e.g., host system 110) may include one or more servers (e.g., server 112) and one or more storage devices (e.g., storage device 114) storing computer-readable instructions. The server 112 may communicate, as needed, with the client devices 102 and 106 executing the web application. For example, in some implementations, the host system 110 may, in addition to providing client-side software for download by the client devices 102 and 106, additionally store server-side information that is used by the web application. The system may use the server-side information to interact with the client devices 102 and 106 (e.g., in real-time) as the client-side software is executed on web browsers by the users 104 and 108. The host system 110 may communicate with the client devices 102 and 106 by any suitable communication medium, such as a communication network 116.

In some implementations, there may be one or more testing systems (e.g., testing system 118 in FIG. 1) operated by one or more users (e.g., administrative users 120 in FIG. 1) who perform tests on the web application to ensure that the web application operates correctly. Such administrative users may be, for example, developers of the web application or other people associated with testing the web application. Such administrative users may utilize one or more computers to implement a web application testing system for testing the web application.

In the example of FIG. 1, a web application testing system 118 is operated by an administrative user 120 to test the web application that is hosted by host system 110. In some examples, a web application testing system may include one or more computers operated by one or more users involved in testing the web application. Additionally or alternatively, in some implementations, a web application testing system may be executed directly on a computing system that hosts the web application (e.g., host system 110) and/or by other users who contribute to testing the web application (e.g., users 104 and 108). As such, a web application testing system may be implemented in a variety of different computing systems and used by a variety of different users to test the web application.

In the example of FIG. 1, the web application testing system 118 may execute one or more instructions specified by the administrative user 120 to perform user-defined tests on the web application that is hosted by host system 110. For example, the web application testing system 118 may enable the administrative user 120 to simulate various test cases, including different web-browsing behavior on different types of web browsers, and test the operation of the web application under the various test cases. As such, a web application testing system (e.g., web application testing system 118) may enable one or more users (e.g., administrative user 120) to perform user-specified tests on a web application to help ensure the proper operation of the web application.

In some implementations, the computing devices 102, 106, 110, and 118 are computing devices, such as laptop or desktop computers, smartphones, personal digital assistants, wearable computers, portable media players, tablet computers, or other appropriate computing devices that can be used to communicate with an electronic communication network. In addition, one or more of the computing devices 102, 106, 110, and 118 may perform client-side operations, as discussed in further detail herein. Also, the computing system 110 may include one or more computing devices, such as a computer server. Further, the computing system 110 may represent more than one computing device working together to perform the server-side operations, as discussed in further detail herein.

In some implementations, the network 116 is a public communication network, e.g., the Internet, cellular data network, dialup modems over a telephone network, or a private communications network, e.g., private LAN, leased lines. The network 108 may include one or more networks. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), or one or more television or cable networks, among others. For example, the communication may occur through a radio-frequency transceiver. In addition, short-range communication may occur, such as using a BLUETOOTH, Wi-Fi, or other such transceiver.

Figure 2:
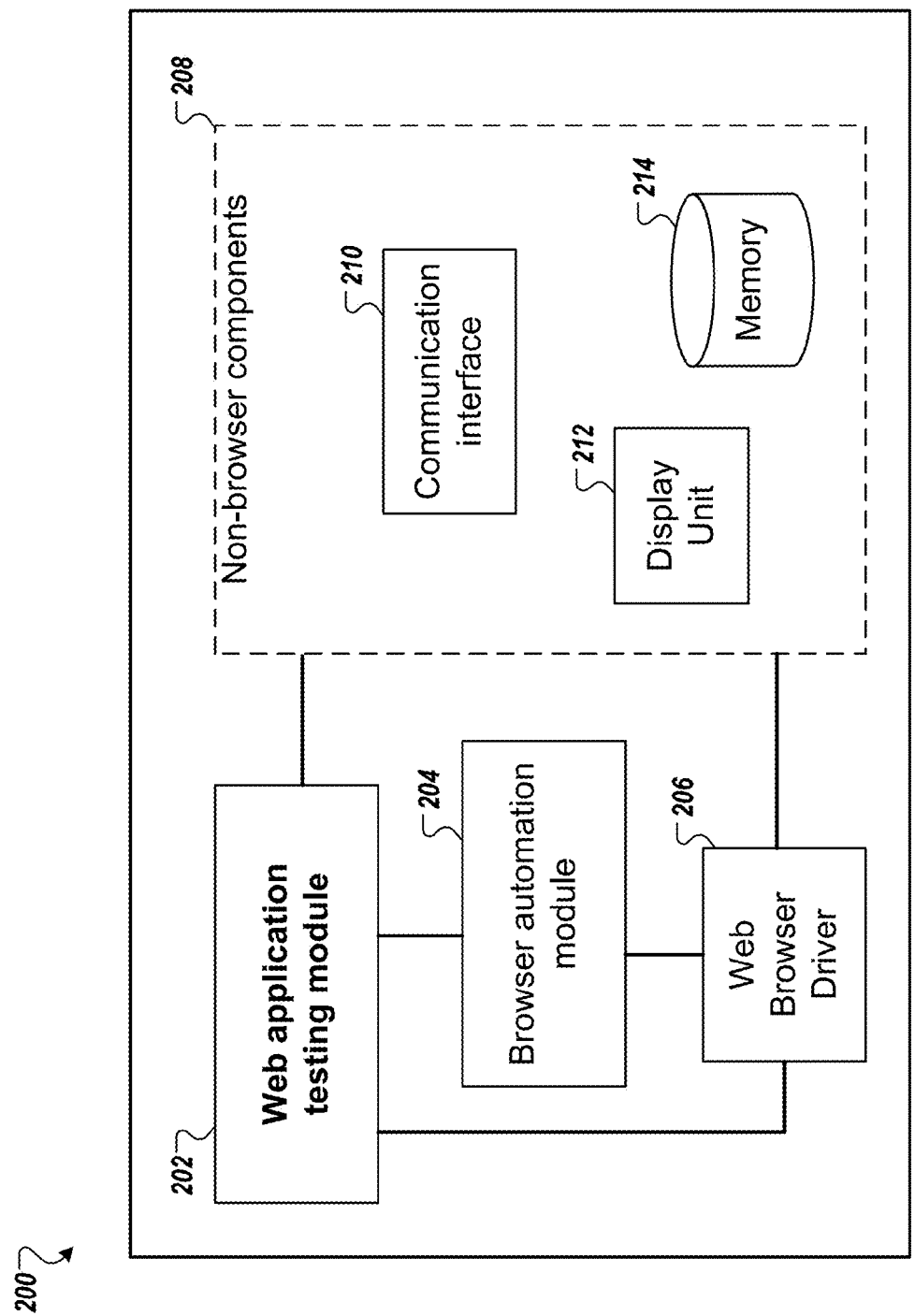
FIG. 2 is a block diagram illustrating an example of components of a system that performs automated testing of web applications.

FIG. 2 illustrates example components of a system that performs automated testing of web applications. A web application testing system 200 in FIG. 2 may be implemented, for example, in a specific configuration of the web application testing system 118 in FIG. 1.

In the example of FIG. 2, web application testing system 200 includes a web application testing module 202. The web application testing module 202 may include one or more processors and one or more storage devices that are configured to implement automated testing for a web application. The web application testing module 202 may receive instructions from the user to test a web application that is executing on a web browser of the system 200. For example, the web application testing module 202 may receive, from the user, a test script that includes user specified instructions for testing the web application.

The web application testing system 200 may take a user-defined test script and convert the test script into a series of lower-level commands. In some implementations, the web application testing module 202 may convert the user-defined test script into different types of commands that control different parts of the testing system 200. For example, the web application testing module 202 may convert the user-defined test script into commands to control operations of a web browser and as well as commands to control other operations of the system 200 that are not associated with the web browser. As such, by controlling both browser operations and non-browser operations of the system 200, the web application testing module 202 provides a more complete testing environment for the web application than would otherwise be possible by controlling browser operations alone.

As an example, the web application testing module 202 may be a module that is added to a general purpose computer to create a modified computer that achieves the functionality described. In some implementations, the web application testing module 202 includes specialized hardware that is designed to control operations of other components of the testing system 200. The web application testing module 202 may interact with one or more other specialized components (which may include specialized hardware) to achieve the functionality described.

For example, the web application testing module 202 may utilize a browser automation module 204 to control operations of a web browser executing on the testing system 200. In this example, the browser automation module 204 may control operations of a web browser, such as opening a new web browser window, navigating to a different web page, or operating an interactive component (e.g., a button, an interactive form, or a selectable link) in a web page. In some implementations, the browser automation module 204 may control operations of the web browser by converting commands provided by the web application testing module 202 into commands that are native to the web browser. Such native browser commands may be written in a different programming language than the commands provided by the web application testing module 202. The native browser commands used by the browser automation module 204 may include direct calls to the web browser using a software driver 206 for the web browser.

However, there may be some operations that cannot be controlled using the browser automation module 204. Such operations may include, for example, controlling particular operations of other components of the testing system 200, such as display unit, communication interfaces, memory devices, etc., and/or may include advanced operations related to the web browser, such as retrieving information within specific elements of a webpage, taking screenshots of a webpage, retrieving/storing information in a database (e.g., a remote database), or other operations that cannot be performed by the browser automation module 204.

Such difficulties may be overcome by a web application testing module (e.g., the web application testing module 202 in FIG. 2) that enables a user to control any suitable operation of the testing system 200 to implement a more complete testing environment for a web application. To achieve this, in some implementations, the web application testing module 202 may convert a user-defined test script into a first set of commands and a second set of commands. The first set of commands may be provided to the browser automation module 204 to control operations of a web browser. The second set of commands may be used by the web application testing module 202 to control other operations of the system 200 that cannot be controlled by the browser automation module 204. In some implementations, both the first command that can be performed by the browser automation module 204 and the second command that cannot be performed by the browser automation module 204 are written in the same programming language (e.g., Java).

The web application testing module 202 may therefore leverage the browser automation module 204 to control low-level browser driver operations (via the web browser driver 206) while at the same time providing a more complete testing environment by enabling the user to control other operations of the testing system 200 that would not otherwise be controllable using the browser automation module 204 alone. For example, such other operations may include advanced operations on a web browser that cannot be performed by the browser automation module 204. Additionally or alternatively, such other operations may include controlling non-browser components 208 of the system 200, such as a communication interface 210, display unit 212, a memory 214, and/or other non-browser components of the system 200.

The web application testing module 202 may therefore convert multiple user-specified instructions into a first set of commands for the browser automation module 204 and a second set of commands to control other operations of the testing system 200. In some implementations, a single user-specified instruction may map to multiple commands, which may include both the first and second types of commands. Both types of commands may also be intermixed or related such that executing the test script involved executing one or more commands from the first set of commands, and then executing one or more commands from the second set of commands, followed again by executing one or more commands from the first set, etc. In some implementations, both first and second types of commands may be executed simultaneously.

As such, the total number of commands (of both the first and second types) that are executed may exceed the number of user-specified instructions in the test script. This may enable the web application testing module 202 to combine the functionality of multiple commands into a single user-specifiable instruction, thus providing a user with a simpler and more compact set of instructions that may enable the user to more efficiently and quickly develop test scripts for different test scenarios.

In some implementations, the web application testing system 200 may perform a command from the second set of commands based on results of executing a command from the first set of commands by the browser automation module 204. For example, the web application testing module 202 may compare a result of executing the first command with a user-specified condition, and execute the second command based on the comparison. The user-specified condition may be determined by direct input from the user, and/or may be determined by accessing the user-specified condition from a memory component (e.g., located in a database external to the at least one computer).

In some implementations, a command generated by the web application testing module 202 may be dynamically generated based on previous results of testing. For example, the web application testing module 202 may enable the user-defined test script to specify conditional branching of test scenarios, such that real-time results of testing determine future test commands that are generated by testing module 202.

As a specific example, a user-defined test script may include instructions for loading a specific web page containing a web application and determining whether a user-specified text string appears in the contents of the web page (or in a URL of the web page). In some scenarios, the browser automation module 204 may be able to load and render the webpage, but it may be unable to perform more advanced operations, such as comparisons or other filtering operations, desired by the user to test the web application. In such scenarios, the web application testing module 202 may control other operations of the system 200 in order to compare the text that is displayed in the webpage with the user-specified text string and output a result of the comparison.

As another example of a testing operation that can be performed by the web application testing module 202, a user-defined test script may include instructions to measure a delay to load content for a specific web page. Again, the browser automation module 204 may be able to load and render a desired webpage, but it may not be able to perform more advanced operations, such as measuring a time to load contents of a web page, or to load specific elements in the web page. In such scenarios, web application testing module 202 may control operations of the system 200 to measure a time delay of loading a content of the web page in the web browser and to compare the measured time delay with a user-specified threshold. If the measured delay of loading the web page exceeds the user-specified threshold (e.g., indicating that the desired web page is slow to render), then the web application module 202 may take remedial steps, such as determining whether certain portions of the content of the web page have loaded by the user-defined threshold time.

The web application testing module 202 may also enable a user to specify one or more parameters to control the testing. Such parameters may be provided, along with the first command, to the browser automation module 204 and/or used during execution of the second command to control operations of the system 200 that are not controllable by the browser automation module 204. The user-specified parameters may be received directly from the user by input, and/or may be determined by accessing the parameters from a database. For example, the web application testing module 202 may determine a network address of a database that stores the one or more user-specified parameters and obtain the parameters from the database at the network address.

In some implementations, the web application testing module 202 may enable a user to perform testing on a web application using user-defined instructions that are in a format and/or language that is simpler that would otherwise be possible if the user were to directly interact with the browser automation module 204 or other components of the testing system 200. As such, the system may enable a user to define a test script in a user-friendly language using simple instructions, and may convert those instructions into low-level commands (e.g., first commands for controlling operations by the browser automation tool 204 and second commands to control other operations).

As such, the web application testing module 202 may not only provide a simpler and easier-to-use user interface for controlling web browsers, but may also provide a more customizable (via user-defined scripts and parameters) and more comprehensive overall testing environment for web applications than would otherwise be provided by the browser automation module 204 alone.

Figure 3:
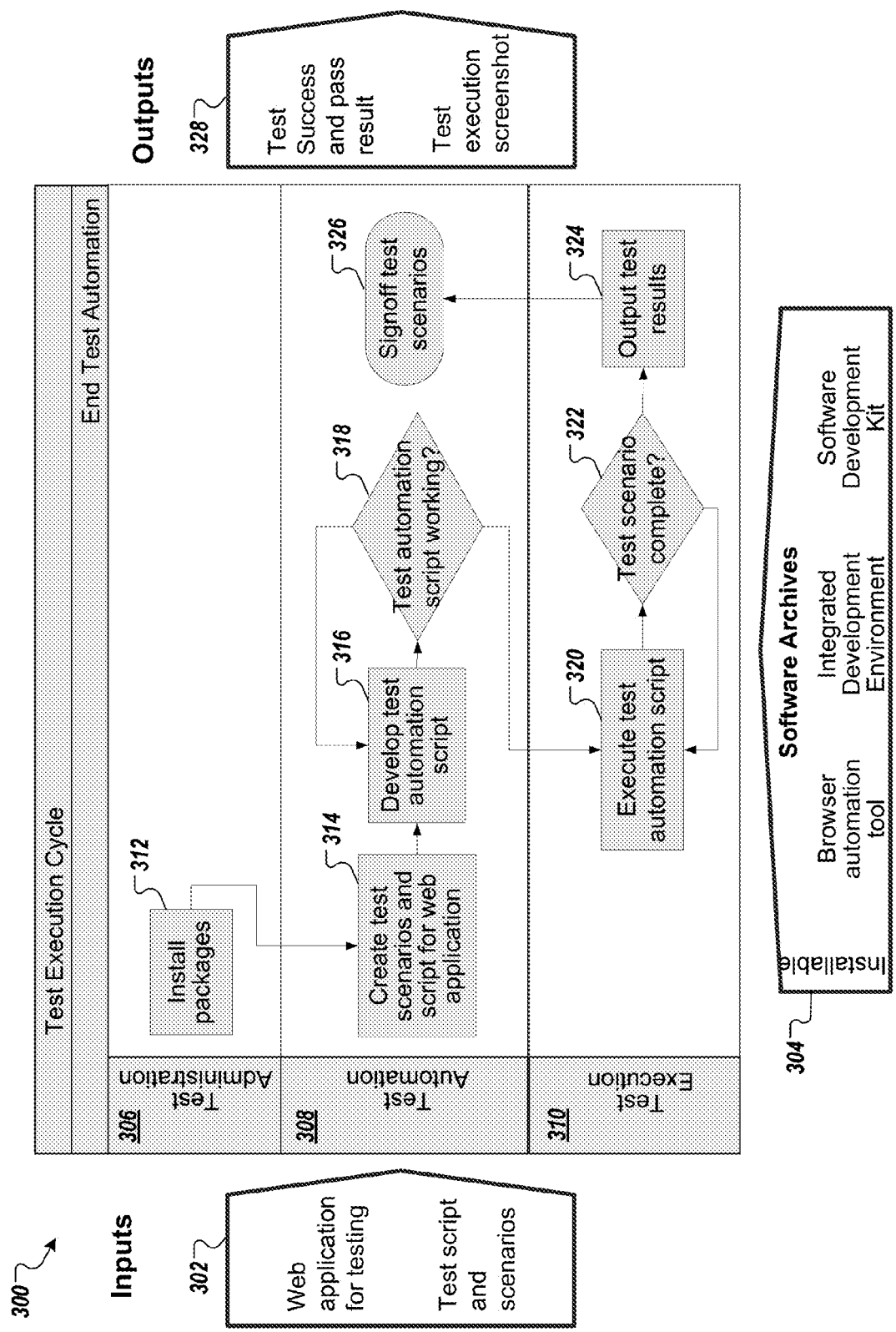
FIG. 3 is a sketch illustrating an example of performing automated testing of web applications.

Referring now to FIG. 3, an example of performing automated testing of web applications is illustrated. The example process 300 may be performed, for example, by a web application testing system (e.g., system 200 in FIG. 2, or system 118 in FIG. 1). In the example process 300, various inputs and software packages may be provided to the web application testing system 200. For example, inputs 302 may include a web application to be tested and a user-defined test script and scenarios. In addition, one or more software archives 304 may be installed, such as a browser automation tool (e.g., browser automation module 204 in FIG. 2, such as the Selenium standalone server), an integrated software development environment (e.g., the Eclipse Integrated Development Environment (IDE)), and a software development kit (e.g., the Java Development Kit (JDK)). In some implementations, software for the web application testing module (e.g., web application testing module 202 in FIG. 2) may also be installed as a software package.

A test execution cycle may include operations that can be divided into various stages of testing, though such categorization is not required for implementation of a web application testing system. In the example of FIG. 3, testing includes a test administration stage 306, a test automation stage 308, and a test execution stage 310. In the example of FIG. 3, in test administration stage 306, one or more software packages may be installed (312). Next, in the test automation stage 308, one or more test scenarios and scripts for testing the web application may be created (314). A test automation script may be developed (316), for example using a browser automation tool (e.g., browser automation module 204 in FIG. 2). The test automation script may undergo operability tests (318) and further development (316) until the test automation script is determined to be working. Next, in the test execution stage 310, the working test automation script may be executed (320). This may involve controlling various operations of the testing system (e.g., system 200 in FIG. 2, or system 118 in FIG. 1) to test the web application. Once the test scenario is complete (322), the system may output results of the test (324) and, based on the test results, sign off on test scenarios (326).

The system may provide various types of outputs 328 regarding the test results. For example, the system may output a pass/fail test result, for example, based on whether a test result satisfies at least one user-specified performance criteria. In some implementations, the system may provide a screenshot of a relevant web page displaying results of operating the web application.

Based on the test results and/or other outputs from the testing, the testing system may determine a report format and generate a document (e.g., an HTML document) according to the determined report format to provide a report for the user summarizing the results of testing the web application. The report may be provided to any suitable user by any suitable technique (e.g., by displaying on a display unit, emailing, printing, or other suitable output).

Figure 4:
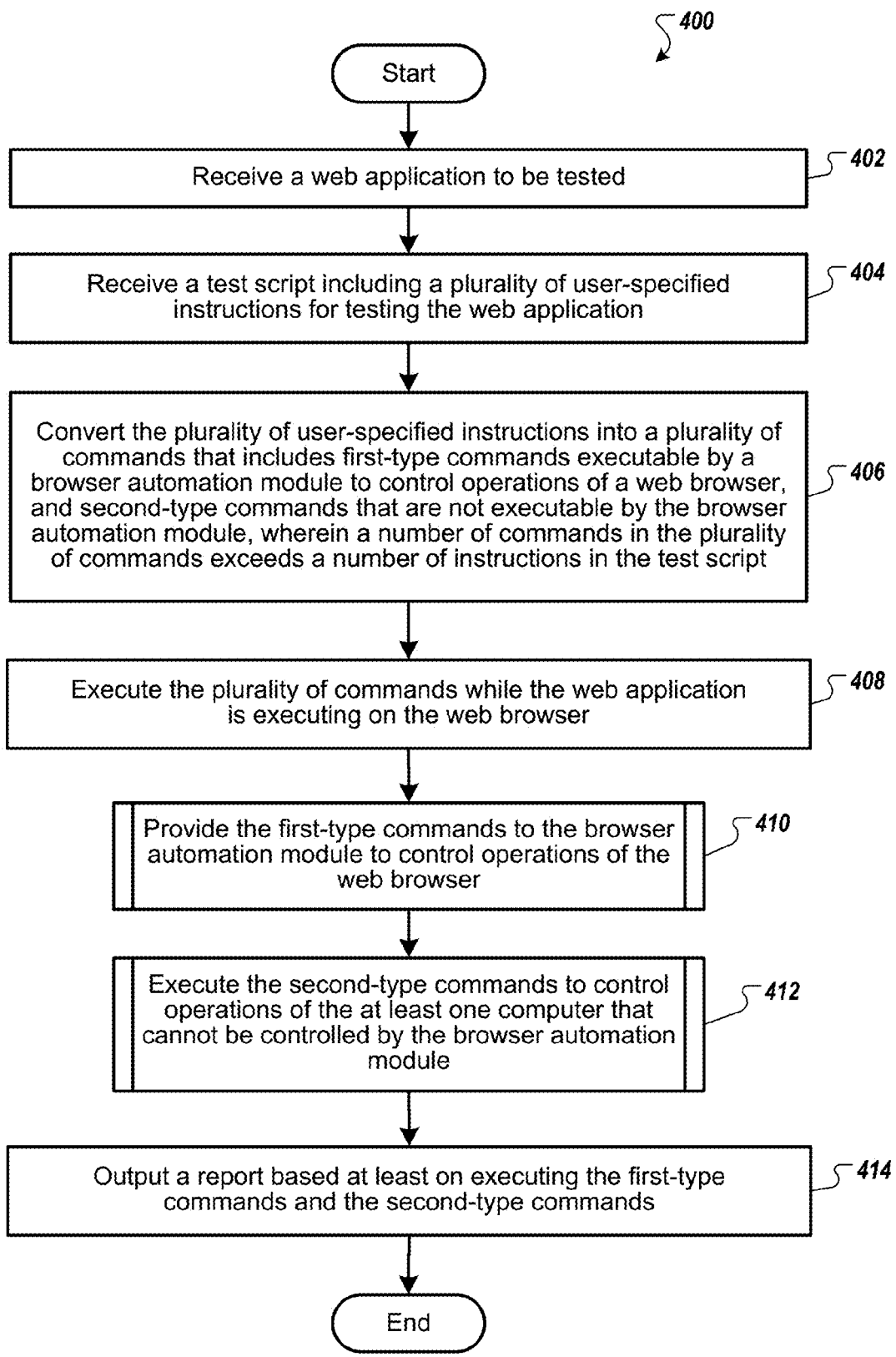
FIGS. 4-6 are flow charts illustrating examples of performing automated testing of web applications.
Figure 5:
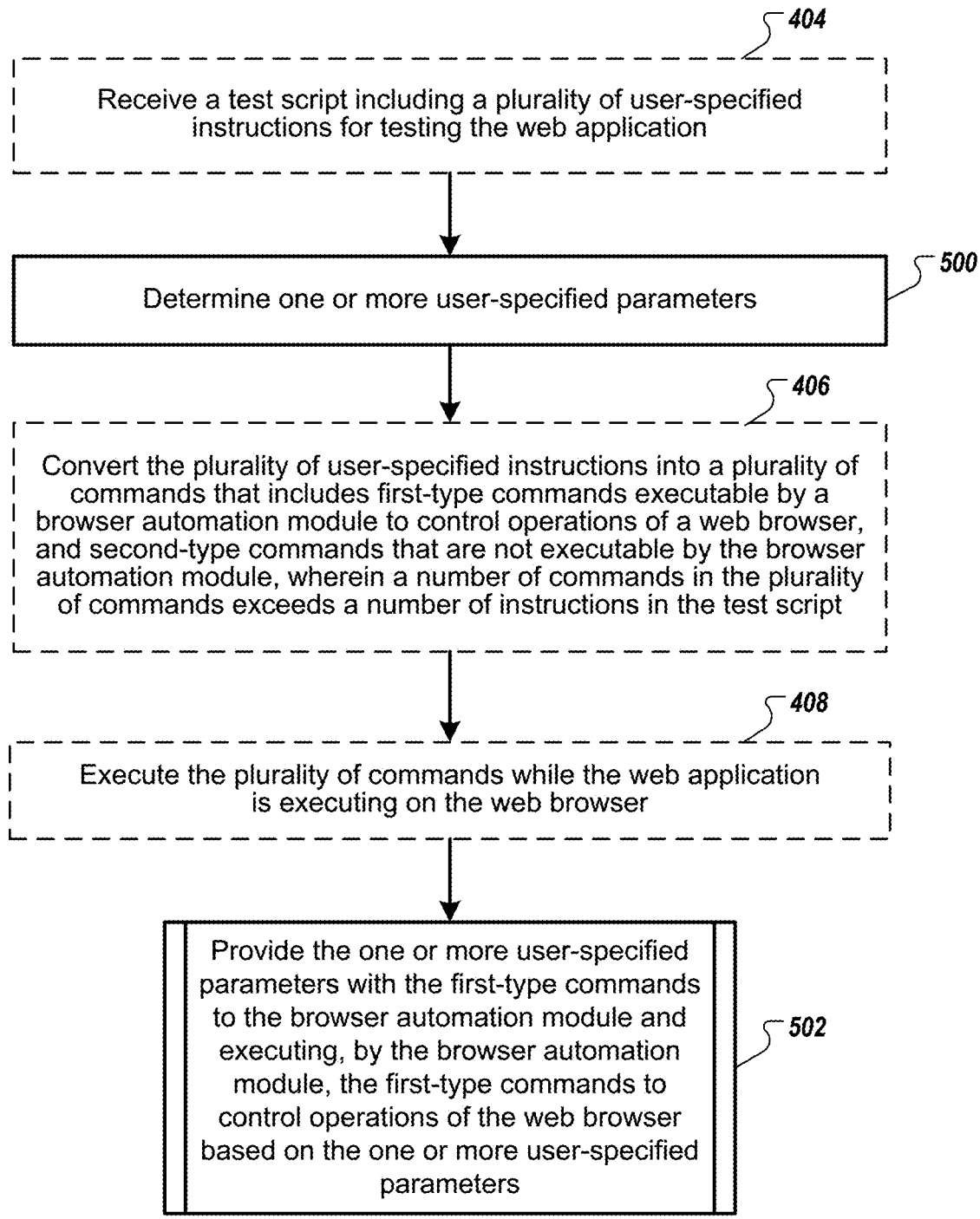
Figure 6:
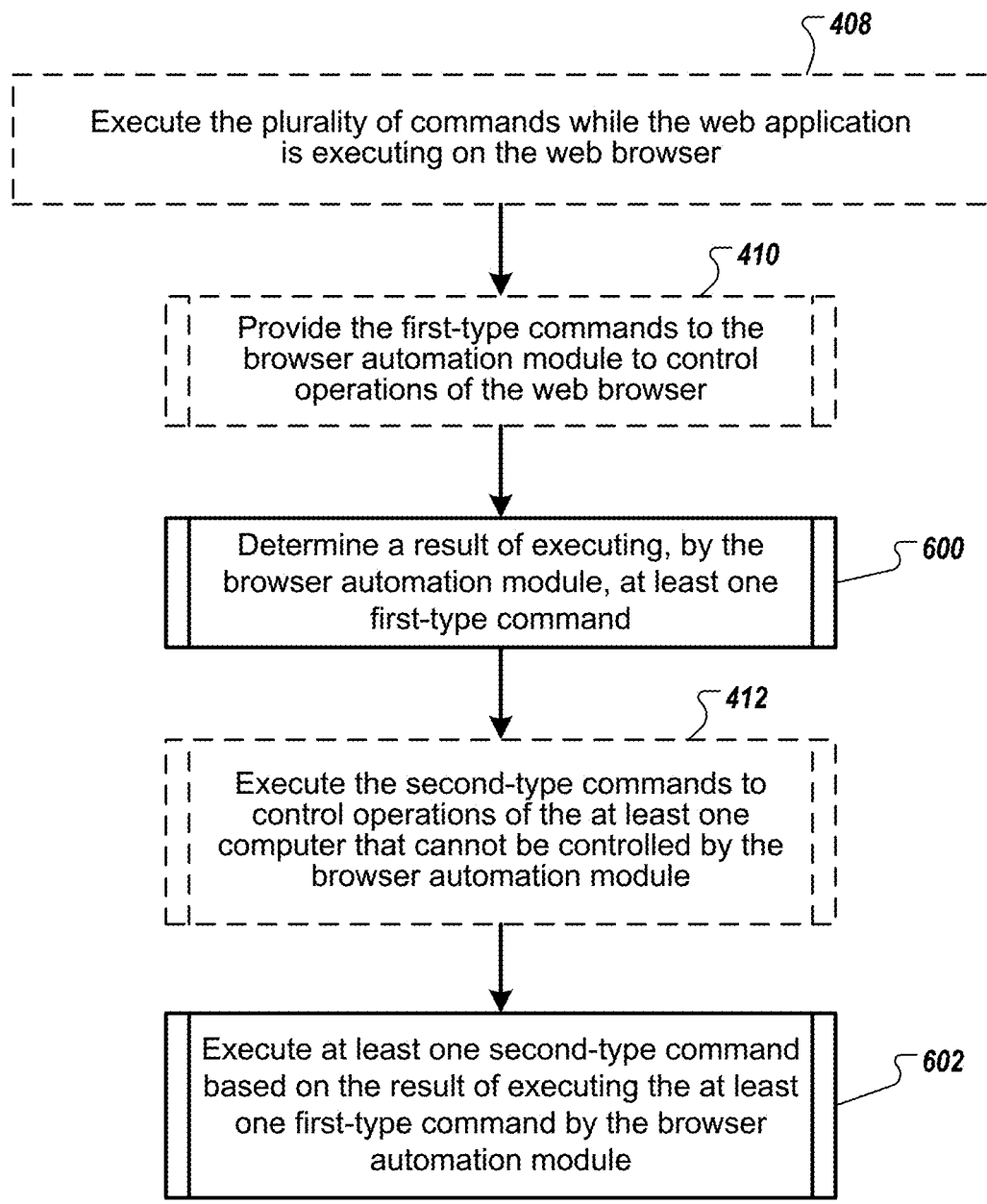

FIGS. 4-6 illustrate examples of performing automated testing of web applications. The example processes in FIGS. 4-6 may be performed by a web application testing system (e.g., system 118 in FIG. 1, or system 200 in FIG. 2).

Referring now to FIG. 4 and the example process 400 of performing automated testing of a web application, the testing system receives a web application to be tested (402) and also receives a test script including a plurality of user-specified instructions for testing the web application (404). The system converts the plurality of user-specified instructions into a plurality of commands that includes two different types of commands (406). First-type commands are executable by a browser automation module (e.g., browser automation module 204 in FIG. 2) to control operations of a web browser. Second-type commands are not executable by the browser automation module 204, and instead are handled by the web application testing module itself. In some implementations, the total number of commands in the plurality of commands (including both first-type and second-type commands) exceeds a number of instructions in the test script that were specified by the user.

The testing system then executes the plurality of commands that were generated from the test script, while the web application is executing on the web browser (408). The testing system is thus able to test the web application. In particular, the testing system executes the plurality of commands by providing the first-type commands to the browser automation module (e.g., browser automation module 204 in FIG. 2) to control operations of the web browser (410). The testing system also executes the second-type commands to control operations of the at least one computer that cannot be controlled by the browser automation module 204 (412). While the example in FIG. 4 illustrates the execution of the second-type commands occurring after the execution of the first-type commands, the two types of commands may be executed in any suitable order (or executed in an intermixed order).

Based on executing the first command and the second command, the testing system may then output a report based at least on executing the first-type commands and the second-type commands (414). Further, while the example of FIG. 4 illustrates generating commands based on a test script before executing the commands during testing, the testing system may generate commands from the test script at any time, such as during testing. For example, in some implementations, one or more commands may be generated dynamically by the web application testing module 202 during testing, rather than generated initially all at once based on the test script. Dynamic generation of test commands by the testing module 202 may be used to implement conditional branches in a user-defined test script in which future test commands are based on results of executing previous test commands.

Referring now to FIG. 5, the testing system may determine one or more user-specified parameters (500). Although the example in FIG. 5 illustrates this determination occurring after receiving a test script and before converting the test script into first-type and second-type commands, the testing system may determine the user-specified parameters at any suitable time (e.g., as an initial step before receiving the test script, after converting the test script into the first and second commands, during execution of testing, etc.).

In the example of FIG. 5, the testing system provides the one or more user-specified parameters with the first-type commands to the browser automation module (e.g., browser automation module 204 in FIG. 2) and executes, by the browser automation module 204, the first-type commands to control operations of the web browser based on the one or more user-specified parameters (502). Additionally, in some implementations, the testing system may use the user-defined parameters during execution of the second-type commands to control operations of the computer that are not controllable by the browser automation module 204. User-specified parameters may be utilized by the testing system in any suitable way to enable the user to customize the testing of a web application.

FIG. 6 shows additional details of executing a first-type command by a browser automation module (e.g., browser automation module 204 in FIG. 2), and a second-type command that cannot be executed by the browser automation module 204. In this example, after the first-type command is executed by the browser automation module 204, the web application testing module (e.g., web application testing module 202 in FIG. 2) determines a result of executing, by the browser automation module 204, at least one first-type command (600). This result may include, for example, determining whether a user-specified text string appears in the content of a web page, or determining whether a delay to load the content of the web page has exceeded a user-specified threshold, or other suitable results from executing an operation of a web browser by the browser automation module 204.

Based on this result, the web application testing module 202 may execute at least one second-type command based on the result of executing the at least one first-type command by the browser automation module 204 (602). For example, the second command executed by the web application testing module 202 may include capturing a screenshot of content displayed in a web browser that has been rendered by the browser automation module 204, filtering content within a web page, measuring time delays of loading content in a web page, retrieving/storing data in a database (e.g., a remote database or a local memory device), etc.

Examples of User-Defined Instructions in Test Scripts

Some specific non-limiting examples of user-defined instructions that may be included in test scripts executed by the web application module are provided next.

The following example shows a simple test script that includes eight user-defined instructions.

SelectDriver.setDriver( );
WebAction.open("http://www.google.com");
WebAction.fillName("q", "Test Automation"+Keys.ENTER);
WebAction.wait(5000);
WebAction.clickLink("Test automation—Wikipedia, the free encyclopedia");
WebAction.wait(5000);
ScreenShot.screenShot( );
WebAction.clickLink("Main page");

In this example, the above eight lines of user-specified instructions that may be included in a test script are converted by a web application testing module (e.g., web application testing module 202) to perform the following eight operations:

1. Load and Open the Firefox driver and browser.
2. Open the URL "https://www.google.com".
3. Fill the Google search box with the text "Test Automation" and click enter.
4. Wait for 5000 milliseconds to load the requested web page displaying the search results.

5. Find and click the link "Test automation—Wikipedia, the free encyclopedia" within the search results displayed in the loaded web page.

6. Wait for an additional 5000 milliseconds to provide buffer time to take a screenshot of the web page displaying the search results.

7. Take a screenshot of the web page displaying the search results.

8. Navigate to the Main Page of the Wikipedia site by clicking the "Main page" link text displayed in the web page.

The above operations include both first commands that can be executed by a browser automation module (e.g., opening and navigating to different URLs) as well as second commands that cannot be executed by the browser automation module (e.g., waiting for a specified amount of time, finding user-specified text within contents of a webpage, and taking screenshots). The web application testing module 202 automatically distinguishes between the first and second commands, without necessarily requiring the user to be aware of such distinctions. Instead, the system enables the user to utilize simpler high-level instructions to perform more comprehensive web application testing than would otherwise be possible by using the browser automation tool 204 alone.

In some implementations, the web application testing module 202 may organize the different possible user-specified instructions in one or more classes (e.g., using object-oriented programming). Some examples of such classes include:

SelectDriver—Used to select browser driver. By default it may choose a driver for a particular type of browser. For example, the SelectDriver class may include an instruction to open a driver for a default browser:

SelectDriver.setDriver( );

To use a browser other than the default browser, the user may explicitly pass a parameter that specifies the driver of the browser:

SelectDriver.setDriver(BrowserDriver);

The above instruction enables a user to use any suitable driver for a web browser.

WebAction—Used to perform action on elements and events of a web page (e.g., click, enter data, etc.). For example, the WebAction class may include an instruction to open a URL in a web browser. To perform this action, the user may specify the instruction:

ClassName.commandName(parameters);

WebAction.open(URL);

In this example, "URL" is a parameter that is passed to the "open" instruction to specify the address of the particular web page that the user is trying to open.

As another example, the WebAction class may include a fill instruction to fill in data in some web element:

WebAction.fill("WebElement", "Data"); //reference of Element & Data.

This instruction may also be used in multiple form if user know the different attributes of an element:

WebAction.fillId("Id", "Data");//fill element whose id="Id" with "Data";

WebAction.fillName("Name","Data");//fill element by its name attribute

WebAction.fillXpath("Xpath", "Data");//fill element by its Xpath.

WebAction.fillClassName("ClassName","Data");//to view all command

As another example, the WebAction class may include a click instruction to click on an element in a web page:

WebAction.click("WebElement");//reference of WebElement to click.

This instruction may also be used as:

WebAction.clickId("Id");//to click an element by its ID.

WebAction.clickName("Name");//to click an element by its Name.

WebAction.clickXpath("Xpath");//to click an element by its Xpath.

WebAction.clickLink("link");//to click an element by its Link Text.

WebAction.clickClassName("ClassName");//and so on . . . .

As another example, the WebAction class may include a wait instruction to stop the execution of a web page for a specific period of time. For example:

WebAction.wait(5000);//5000 ms=5 sec

The above instructions will stop the execution of next step for next 5 sec.

WebAction.wait(5000, "id");

The above instruction will stop the execution of the next step until finding an element with an ID attribute that matches the user-specified "id" parameter, or 5 seconds wait, whichever happens first. There also may be other attributes by which the system can set the wait command.

WebData—Used to retrieve data from an element of the web page (e.g., data inside the element's tag or its attribute value). For example, this class may include an instruction to retrieve data within a tag of an element in a web page:

WebData.get("WebElement");//reference of the WebElement.

Or a known attribute of an element may be used to get its data:

WebData.getId("id");//By id

WebData.getName("name");//By name

To retrieve a data value of an attribute, either of the following instructions may be used:

WebData.getAttribute("WebEement", "AttributeName");

WebData.getAttribute("id", "AttributeName");//etc.

WebSelection—Used to select an element of a web page. For example, this class may include an instruction to get a reference of a web element by selecting that web element by an identifier:

WebSelection.findId("id");//Selecting an element with its 'ID' attribute

ScreenShot—Used to take a screenshot of a web page where applied.

Snapshot instructions may be used to take a snapshot of a complete web page, even covering portions hidden under a scroll, thus capturing every part of a complete web page. It may be used to save a snapshot as a file in JPEG format, with a default name as number denoting the time of the screenshot in milliseconds.

ScreenShot.screenShot( );

The above instruction will take the screenshot of the current web page and save it in a particular folder. The user may have the option to choose the name of the file by passing name in parameter.

ScreenShot.screenShot("FileName");

The user may be able to decide the path to store the Screen Shots in the desired folders.

ScreenShot.setDirectory("Path");

ParamAction—Used to parameterize the action by using a CSV file. To start parameterization, a file path may be set for the source CSV file which contains the parameter data:

ParamAction.setDirectory("FilePath");

The CSV file may store an ID or Name or other identifier of elements which are used in the test script. For example:

Open a login page—http://www.login.com
Fill username in the Element with id—"user"
Fill password in the Element with id—"pass"
Click on submit button with id—"sub"
Repeat these steps for three users with usernames and passwords as follows:

| | |
|---|---|
| User1 | Pass1 |
| User2 | Pass2 |
| User3 | Pass3 |

The CSV file may be as shown

| user | pass |
|---|---|
| User1 | Pass1 |
| User2 | Pass2 |
| User3 | Pass3 |

Once a CSV file has been built, a test script can be created:

```
0   SelectDriver.setDriver( );
1   ParamAction.setTable("C:\\login\\login.csv");
2   int i=1;
3   while(i<ParamAction.rows( )){
4       WebAction.open("https://www.login.com");
5       WebAction.wait(15000,"user");
6       ParamAction.fillId("user", i);
7       ParamAction.fillId("pass", i);
8       WebAction.clickId("sub");
9       i++;
10  }
```

The first line is used to set the path of the source file.

The second line is used to initiate a variable with value 1, i.e., row 1.

The third line is the start of loop that start from the first line (second line of CSV, first line of CSV is equal to 0) and end at last row with data. The instruction ParamAction.rows( ); is used to deliver the number of data lines CSV file have excluding top line containing identifiers.

The fourth line is used to open the URL.

The fifth line is used to wait (Failsafe) max wait=15 sec to load the data.

The sixth line is used to fill element with ID='user' from CSV file data.

The seventh line is used to fill element with ID='pass' from CSV file data.

The eighth line is used to click the submit button.

The ninth line is used to increment the row.

The tenth line represents the end of parameterization.

The above example shows how to design a simple framework for creating parameterized regression login test. There may be other instructions provided by the ParamAction Class, e.g., for filling data in a form.

Another instruction provided by the ParamAction Class is:

ParamAction.getData("ColumnName", "RowNumber");

This will check for Data in the column "ColumnName" on the row "RowNumber" and returns the data as a String. This help in accessing data from a specified location from table in CSV file.

From above example, to obtain the value of the username from "user" Column in the second row:

ParamAction.getData("user","2");//"2" is actually line 3 in CSV.

This will return a String "User2".// value in the row 2 (line 3 in CSV) column "user" (line 0 column value of csv).

So in short, the user can save data in the CSV file and can retrieve it with the help of value in 'Header row' (e.g., 'First row' or 'line 0' of the CSV file).

This enable a user to define a test script according to his/her own specifications and to retrieve data with just one command once a path is setup.

WebTest—Used to test validity of data contained by an element of the web page and used to generate test results. An example of a WebTest instruction is:

WebTest.test(WebElement, "DataToCompare");

Here, the system compares the value of the WebElement to the expected Data "DataToCompare". The result of this test then can be output in an HTML format having a Table containing Test Number, Expected Result, Actual Result and Result as column.

Other instructions include:

WebTest.testId("id", "DataToCompare");
WebTest.testName("name", "DataToCompare");

To generate the result in HTML format of a test executed at any time, the following instructions may be used:

WebTest.createHTML( );//or
WebTest.createHTML("filename");//Name of HTML file.

The system may also provide instructions to set the directory to store the HTML file, and to retrieve it later:

WebTest.setDirectory(path);
WebTestgetDirectory( );

In some implementations, the system may also enable a user to specify advanced instructions. Advanced instructions may be used, for example, to perform advanced operations, such as selecting an element inside another element in a web page, opening a window, closing a window or tab, moving execution from one window to another, one tab to another or between frames.

In some implementations, advanced instructions may also be used to parameterize a test script, create a test log, save a snapshot, etc.

For example, browser-based advanced instructions may include Open and Execute:

WebAction.newWindow( );//open a new window.
WebAction.openWindow("Handle");//move to an open window.

Advanced instructions may also include Find:

WebData.getWindow( );//return open window handle.
WebData.getWindows( );//return ArrayList of all open windows handle.
WebData.newWindow("Handle");//return newly open second window.
WebData.newWindow(ArrayList<Handles>);//return new open window.

Advanced instructions may also include Close:

WebAction.closeWinow( );//close the current window.

As a specific example, a user may have two browser windows open and the next event (Click on Element with ID="elem") in the test script may be designed to open a new Window. To move execution to the new window, the system first finds out the handle of the new window, the handle being a string that identifies a Window uniquely.

ArrayList<String> handle=WebData.getWindows( );//save existing handle

WebAction.clickId("elem");//event that opens up a new window.

String newWindow=WebData.getnewWindow(handle);//pass old list in command to check for a new window and save it WebAction.openWindow(newWindow);//focus in new window.

Similar advanced instructions may be provided to work with Tab.

Other advanced instructions may be provided to work with Frame and Alert:

WebAction.chooseFrame("frame");//"frame" could be ID, Name, Order.

WebAction.alertAccept( );//to accept an alert.

WebAction.alertDecline( );//to decline an alert.

Other advanced instructions may be provided to control Movement:

WebAction.back( );//to move back to previous page.

WebAction.forward( );//to move back to next page.

WebAction.refresh( );//to refresh a page.

Other advanced instructions may be provided to control URL:

WebAction.baseURL( );//return the localhost name.

WebAction.path( );//return the path of the page without first '/' symbol.

In some scenarios, a particular webpage may make it difficult to uniquely choose an element than can be used to implement an advanced instruction. For example, suppose a web page has two rows of buttons, one in Top and one in Bottom. Both rows contain similar buttons with similar attributes and cannot be identified uniquely. An example is provided in the following HTML code:

```
<HTML>
    <BODY>
        <Div id= topROW>
            <Input type=button name=save>
            <Input type=button name=cancel>
        </Div>
...................................................//other Tags in between.
        <Div id= bottomROW>
            <Input type=button name=save>
            <Input type=button name=cancel>
        </Div>
    </BODY>
</HTML>
```

In the above example, suppose a user specifies an instruction to click the above Save button:

WebAction.clickName("save");

This instruction will not work because there are two elements with the name "save" in the web page. To solve this issue, the system may utilize additional attributes to distinguish between the elements. For example, the system may first select the element that only holds the first 'Save' button and can be identified uniquely as Div Tag in the above example. This may be done by the following instruction:

WebAction.clickInName("topRow", "save");

Here, the first parameter is the ID of the external Element and second parameter can be any attribute that uniquely identifies the inner element inside the exterior Element.

Likewise the system can find a number of instructions that have "In" in the middle of the name to identify them as instructions that work with 'Inner' elements.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations and all of the functional operations described in this specification may be realized in digital electronic circuitry, or in computer software, firmware, or hardware, including the structures disclosed in this specification and their structural equivalents, or in combinations of one or more of them. Implementations may be provided using one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be provided on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be provided in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be provided in combination in a single implementation. Conversely, various features that are described in the context of a single implementation may also be provided in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A computer-implemented method performed by at least one computer, the method comprising:
   receiving a web application to be tested;
   receiving a test script including a plurality of user-specified instructions for testing the web application;
   converting the plurality of user-specified instructions from the test script into a plurality of commands that includes first-type commands executable by a browser automation module to control operations of a web browser, and second-type commands to control at least one non-browser component of the at least one computer, wherein a number of commands in the plurality of commands exceeds a number of instructions in the test script;
   executing the plurality of commands while the web application is executing on the web browser, wherein executing the plurality of commands comprises:
      providing the first-type commands to the browser automation module to control operations of the web browser;
      executing the second-type commands to control operations of the at least one non-browser component of the at least one computer; and
      dynamically generating and executing at least one second-type command to control the at least one non-browser component, wherein the at least one second-type command is different than the plurality of commands that are generated based on the test script, and wherein the at least one second-type command is dynamically generated based on at least one real-time result of executing at least one previous command of the plurality of commands, the at least one real-time result indicating that the browser automation module is unable to perform an operation requested by the at least one previous command; and
   outputting a report based at least on executing the at least one dynamically generated command, the first-type commands, and the second-type commands.

2. The method of claim 1, wherein converting the plurality of user-specified instructions from the test script into a plurality of commands comprises:
   expanding a single user-specified instruction from the test script into at least one first-type command and at least one second-type command.

3. The method of claim 1, wherein executing the plurality of commands comprises:
   executing a sequence of commands that includes an intermixing of a plurality of first-type commands with a plurality of second-type commands.

4. The method of claim 1, further comprising:
   determining one or more user-specified parameters; and
   providing the one or more user-specified parameters with the first-type commands to the browser automation module and executing, by the browser automation module, the first-type commands to control operations of the web browser based on the one or more user-specified parameters.

5. The method of claim 1, wherein executing, by the browser automation module, the first-type commands to control operations of the web browser includes at least one of:
opening a new web browser window, navigating to a different web page, or operating an interactive component in a web page.

6. The method of claim 1, wherein executing, by the browser automation module, the first-type commands to control operations of the web browser comprises:
converting the first-type commands into commands that are native to the web browser and that perform the operations of the web browser.

7. The method of claim 6, wherein the first-type commands are in a first programming language that is different than a programming language of the commands that are native to the web browser.

8. The method of claim 6, wherein the commands that are native to the web browser include a direct call to the web browser using a software driver for the web browser.

9. The method of claim 1, wherein:
executing the second-type commands comprises executing the second-type commands without utilizing the browser automation module, and
the operations that are controlled by executing the second-type commands comprise at least one of selecting a software driver for a web browser, retrieving data contained in an element of a web page, or taking a screen shot of a web page.

10. The method of claim 1, further comprising:
determining a result of executing, by the browser automation module, at least one first-type command,
wherein executing the second-type commands comprises executing at least one second-type command based on the result of executing the at least one first-type command by the browser automation module.

11. The method of claim 10, wherein executing the at least one second-type command based on the result of executing the at least one first command by the browser automation module comprises:
comparing the result of executing the at least one first-type command with a user-specified condition; and
executing the at least one second-type command based on comparing the result with the user-specified condition.

12. The method of claim 11, wherein the result of executing the at least one first-type command by the browser automation module includes text that is included in content of a web page or in a URL of a web page, and wherein comparing the result with a user-specified condition includes comparing the text with a user-specified text string.

13. The method of claim 11, wherein the result of executing the at least one first-type command by the browser automation module includes a measured time delay of loading content of a web page in the web browser, and wherein comparing the output with a user-specified condition includes comparing the measured time delay with a user-specified threshold.

14. The method of claim 13, wherein executing the at least one second-type command based on comparing the result of executing the at least one first-type command by the browser automation module with the user-specified condition comprises:
based on determining that the measured time delay of loading the content of the web page is greater than the user-specified threshold, determining whether a portion of the content of the web page has loaded.

15. The method of claim 11, further comprising:
operating a communication component of the at least one computer to access the user-specified condition from a memory component located in a database external to the at least one computer.

16. The method of claim 1, wherein the first-type commands executable by the browser automation module and the second-type commands that are not executable by the browser automation module are both written in the same programming language.

17. The method of claim 1, further comprising:
determining, based on the result of performing the automated test of the web application, whether the web application satisfies at least one user-specified performance criteria.

18. The method of claim 1, wherein outputting a report based on a result of performing the automated test of the web application comprises:
determining a report format based at least on at least one second-type command; and
generating a HTML document according to the determined report format.

19. A system comprising:
one or more computers; and
a computer-readable medium coupled to the one or more computers having instructions stored thereon which, when executed by the one or more computers, cause the one or more computers to perform operations comprising:
receiving a web application to be tested;
receiving a test script including a plurality of user-specified instructions for testing the web application;
converting the plurality of user-specified instructions from the test script into a plurality of commands that includes first-type commands executable by a browser automation module to control operations of a web browser, and second-type commands to control at least one non-browser component of the one or more computers, wherein a number of commands in the plurality of commands exceeds a number of instructions in the test script;
executing the plurality of commands while the web application is executing on the web browser, wherein executing the plurality of commands comprises:
providing the first-type commands to the browser automation module to control operations of the web browser;
executing the second-type commands to control operations of the at least one non-browser component of the one or more computers; and
dynamically generating and executing at least one second-type command to control the at least one non-browser component, wherein the at least one second-type command is different than the plurality of commands that are generated based on the test script, and wherein the at least one second-type command is dynamically generated based on at least one real-time result of executing at least one previous command of the plurality of commands, the at least one real-time result indicating that the browser automation module is unable to perform an operation requested by the at least one previous command; and
outputting a report based at least on executing the at least one dynamically generated command, the first-type commands, and the second-type commands.

20. A non-transitory computer storage medium encoded with a computer program, the computer program comprising instructions that when executed by one or more processors cause the one or more processors to perform operations comprising:

receiving a web application to be tested;

receiving a test script including a plurality of user-specified instructions for testing the web application;

converting the plurality of user-specified instructions from the test script into a plurality of commands that includes first-type commands executable by a browser automation module to control operations of a web browser, and second-type commands to control at least one non-browser component, wherein a number of commands in the plurality of commands exceeds a number of instructions in the test script;

executing the plurality of commands while the web application is executing on the web browser, wherein executing the plurality of commands comprises:

provide the first-type commands to the browser automation module to control operations of the web browser;

executing the second-type commands to control operations of the at least one non-browser component; and dynamically generating and executing at least one second-type command to control the at least one non-browser component, wherein the at least one second-type command is different than the plurality of commands that are generated based on the test script, and wherein the at least one second-type command is dynamically generated based on at least one real-time result of executing at least one previous command of the plurality of commands, the at least one real-time result indicating that the browser automation module is unable to perform an operation requested by the at least one previous command; and outputting a report based at least on executing the at least one dynamically generated command, the first-type commands, and the second-type commands.

* * * * *